(12) United States Patent
Kamran et al.

(10) Patent No.: US 11,436,138 B2
(45) Date of Patent: Sep. 6, 2022

(54) ADAPTIVE ENDURANCE TUNING OF SOLID-STATE STORAGE SYSTEM

(71) Applicant: EMC IP Holding Company LLC, Hopkinton, MA (US)

(72) Inventors: Lior Kamran, Rishon LeZion (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/075,951

(22) Filed: Oct. 21, 2020

(65) Prior Publication Data

US 2022/0121563 A1 Apr. 21, 2022

(51) Int. Cl.
*G06F 12/02* (2006.01)
*G06F 3/06* (2006.01)

(52) U.S. Cl.
CPC ........ *G06F 12/0246* (2013.01); *G06F 3/0616* (2013.01); *G06F 3/0631* (2013.01);
(Continued)

(58) Field of Classification Search
CPC .. G06F 12/0246; G06F 3/0616; G06F 3/0631; G06F 3/0679; G06F 2212/1036;
(Continued)

(56) References Cited

U.S. PATENT DOCUMENTS 7,165,155 B1  1/2007 Duprey et al.
7,440,982 B2 10/2008 Lu et al.
(Continued)

FOREIGN PATENT DOCUMENTS

WO         2016111954 A1   7/2016
WO  PCT/US2019/024885    1/2020
(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Tasnima Matin
(74) *Attorney, Agent, or Firm* — Ryan, Mason & Lewis, LLP

(57) ABSTRACT

Techniques are provided for automated adaptive endurance tuning of solid-state storage media. For example, a storage control system tracks usage metrics associated with utilization of solid-state storage devices of a storage system, wherein the storage system comprises an amount of over-provisioned capacity allocated in the solid-state storage devices according to an over-provisioning factor. The storage control system determines a current endurance value of the data storage system based at least in part on the usage metrics, and compares the current endurance value to a target endurance value to determine if the current endurance value differs from the target endurance value. The storage control system automatically adjusts the over-provisioning factor in response to determining a difference between the current endurance value and the target endurance value, and automatically adjusts the amount of over-provisioned capacity allocated in the solid-state storage devices according to the adjusted over-provisioning factor.

20 Claims, 6 Drawing Sheets

(52) U.S. Cl.
CPC .... *G06F 3/0679* (2013.01); *G06F 2212/1036* (2013.01); *G06F 2212/214* (2013.01); *G06F 2212/7204* (2013.01); *G06F 2212/7211* (2013.01)

(58) Field of Classification Search
CPC ....... G06F 2212/214; G06F 2212/7204; G06F 2212/7211
See application file for complete search history.

(56) References Cited

U.S. PATENT DOCUMENTS

| | | | |
|---|---|---|---|
| 7,444,464 B2 | 10/2008 | Urmston et al. | |
| 8,095,726 B1 | 1/2012 | O'Connell et al. | |
| 8,214,612 B1 | 7/2012 | Natanzon | |
| 8,301,593 B2 | 10/2012 | Hoffmann et al. | |
| 8,335,899 B1 | 12/2012 | Meiri et al. | |
| 8,479,080 B1* | 7/2013 | Shalvi | G06F 11/10 |
| | | | 714/774 |
| 8,677,054 B1* | 3/2014 | Meir | G06F 3/0631 |
| | | | 711/103 |
| 9,104,326 B2 | 8/2015 | Frank et al. | |
| 9,158,670 B1* | 10/2015 | Kang | G06F 3/0608 |
| 9,208,162 B1 | 12/2015 | Hallak et al. | |
| 9,286,003 B1 | 3/2016 | Hallak et al. | |
| 9,514,014 B2 | 12/2016 | Webman et al. | |
| 9,552,258 B2 | 1/2017 | Hallak et al. | |
| 9,606,870 B1 | 3/2017 | Meiri et al. | |
| 9,716,754 B2 | 7/2017 | Swift | |
| 9,891,994 B1 | 2/2018 | Schneider et al. | |
| 10,176,046 B1 | 1/2019 | Hu et al. | |
| 10,261,693 B1 | 4/2019 | Schneider et al. | |
| 10,324,640 B1 | 6/2019 | Chen et al. | |
| 10,338,851 B1 | 7/2019 | Kronrod et al. | |
| 10,359,965 B1 | 7/2019 | Stronge et al. | |
| 10,394,485 B1 | 8/2019 | Chen et al. | |
| 10,437,501 B1 | 10/2019 | Kucherov et al. | |
| 10,437,855 B1 | 10/2019 | Stronge et al. | |
| 10,466,925 B1 | 11/2019 | Blanco et al. | |
| 10,496,324 B2 | 12/2019 | Meiri et al. | |
| 10,496,489 B1 | 12/2019 | Chen et al. | |
| 10,496,672 B2 | 12/2019 | Meiri et al. | |
| 10,558,613 B1 | 2/2020 | Shveidel et al. | |
| 10,592,159 B2 | 3/2020 | Kucherov et al. | |
| 10,592,161 B1 | 3/2020 | Chen et al. | |
| 10,606,519 B1 | 3/2020 | Shveidel | |
| 10,635,533 B2 | 4/2020 | Schneider et al. | |
| 10,684,915 B2 | 6/2020 | Schneider et al. | |
| 10,691,355 B2 | 6/2020 | Kucherov et al. | |
| 10,691,373 B2 | 6/2020 | Harduf et al. | |
| 10,691,551 B2 | 6/2020 | Meiri et al. | |
| 10,698,772 B2 | 6/2020 | Hu et al. | |
| 10,705,965 B2 | 7/2020 | Shveidel et al. | |
| 10,719,253 B2 | 7/2020 | Alkalay et al. | |
| 10,725,855 B2 | 7/2020 | Shani et al. | |
| 10,754,559 B1 | 8/2020 | Meiri et al. | |
| 10,754,575 B2 | 8/2020 | Stronge | |
| 10,754,736 B2 | 8/2020 | Shani et al. | |
| 10,761,933 B2 | 9/2020 | Moore et al. | |
| 10,783,038 B2 | 9/2020 | Moore et al. | |
| 2007/0022121 A1 | 1/2007 | Bahar et al. | |
| 2008/0279462 A1 | 11/2008 | Celi, Jr. | |
| 2009/0132955 A1 | 5/2009 | Garg et al. | |
| 2009/0276593 A1 | 11/2009 | Jacobson et al. | |
| 2010/0122015 A1* | 5/2010 | Fusella | G06F 12/0246 |
| | | | 711/E12.001 |
| 2010/0179941 A1 | 7/2010 | Agrawal et al. | |
| 2011/0022566 A1 | 1/2011 | Beaverson et al. | |
| 2011/0225123 A1 | 9/2011 | D'Souza et al. | |
| 2012/0124282 A1 | 5/2012 | Frank et al. | |
| 2012/0278530 A1* | 11/2012 | Ebsen | G06F 13/1673 |
| | | | 711/103 |
| 2012/0303873 A1* | 11/2012 | Nguyen | G06F 3/0616 |
| | | | 711/103 |
| 2013/0080617 A1* | 3/2013 | Driesen | H04L 47/823 |
| | | | 709/224 |
| 2013/0305002 A1 | 11/2013 | Hallak et al. | |
| 2013/0325824 A1 | 12/2013 | Shoens | |
| 2014/0101379 A1* | 4/2014 | Tomlin | G06F 3/0608 |
| | | | 711/103 |
| 2014/0181016 A1 | 6/2014 | Whitehead et al. | |
| 2014/0244935 A1 | 8/2014 | Ezra et al. | |
| 2015/0378766 A1 | 12/2015 | Beveridge et al. | |
| 2015/0378785 A1 | 12/2015 | Tarasuk-Levin et al. | |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2016/0261513 A1 | 9/2016 | Aingaran et al. | |
| 2016/0342344 A1* | 11/2016 | Kankani | G06F 3/0616 |
| 2016/0345207 A1 | 11/2016 | Kwak et al. | |
| 2017/0003880 A1* | 1/2017 | Fisher | G06F 3/0619 |
| 2017/0075842 A1 | 3/2017 | Su et al. | |
| 2017/0160957 A1* | 6/2017 | Thangaraj | G06F 3/064 |
| 2017/0185529 A1 | 6/2017 | Chhabra et al. | |
| 2017/0192857 A1 | 7/2017 | Meiri et al. | |
| 2017/0242592 A1* | 8/2017 | Camp | G06F 3/0605 |
| 2018/0095873 A1 | 4/2018 | Nakagoe et al. | |
| 2019/0303490 A1 | 10/2019 | Chen et al. | |
| 2019/0370354 A1 | 12/2019 | Kucherov et al. | |
| 2019/0370355 A1 | 12/2019 | Kucherov et al. | |
| 2019/0370356 A1 | 12/2019 | Kucherov et al. | |
| 2019/0370357 A1 | 12/2019 | Kucherov et al. | |
| 2019/0392060 A1 | 12/2019 | Meiri et al. | |
| 2020/0026616 A1 | 1/2020 | Hu et al. | |
| 2020/0057716 A1* | 2/2020 | Bahirat | G06F 12/0246 |
| 2020/0097174 A1 | 3/2020 | Moore et al. | |
| 2020/0097363 A1 | 3/2020 | Moore et al. | |
| 2020/0097393 A1 | 3/2020 | Moore et al. | |
| 2020/0125276 A1 | 4/2020 | Shani et al. | |
| 2020/0192738 A1* | 6/2020 | Sarkar | G06F 12/10 |
| 2020/0218601 A1 | 7/2020 | Schneider et al. | |
| 2020/0218610 A1 | 7/2020 | Schneider et al. | |
| 2020/0225849 A1 | 7/2020 | Meiri et al. | |
| 2020/0226023 A1 | 7/2020 | Meiri | |
| 2020/0226145 A1 | 7/2020 | Meiri | |
| 2020/0233704 A1 | 7/2020 | Alkalay et al. | |
| 2020/0233705 A1 | 7/2020 | Alkalay et al. | |
| 2020/0233881 A1 | 7/2020 | Harduf et al. | |
| 2020/0242130 A1 | 7/2020 | Chen et al. | |
| 2020/0249868 A1 | 8/2020 | Glimcher et al. | |
| 2020/0249869 A1 | 8/2020 | Glimcher et al. | |
| 2020/0250089 A1 | 8/2020 | Kamran et al. | |
| 2020/0250144 A1 | 8/2020 | Natanzon et al. | |
| 2020/0272542 A1 | 8/2020 | Meiri et al. | |
| 2020/0272600 A1 | 8/2020 | Natanzon et al. | |
| 2020/0285268 A1 | 9/2020 | Meiri et al. | |
| 2020/0285402 A1 | 9/2020 | Meiri et al. | |
| 2020/0301784 A1 | 9/2020 | Chen | |
| 2020/0310649 A1 | 10/2020 | Chen et al. | |
| 2020/0310654 A1 | 10/2020 | Meiri et al. | |
| 2020/0326877 A1 | 10/2020 | Chen et al. | |
| 2020/0327024 A1 | 10/2020 | Alkalay et al. | |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

(56) References Cited

OTHER PUBLICATIONS

Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Dell EMC, "PowerMax OS," Dell EMC PowerMax Family Product Guide, May 2019, 192 pages.
Dell EMC, "Dell EMC VxRack FLEX," Dell EMC Product Overview, 2018, 5 pages.
U.S. Appl. No. 15/662,708 filed in the name of Xiangping Chen et al. filed Jul. 28, 2017, and entitled "Token-Based Data Flow Control in a Clustered Storage System."
U.S. Appl. No. 15/793,121 filed in the name of David Meiri et al. filed Oct. 25, 2017, and entitled "Opportunistic Compression of Replicated Data in a Content Addressable Storage System."
U.S. Appl. No. 15/824,536, filed in the name of Christopher Sayles et al. filed Nov. 28, 2017, and entitled "Storage System with Asynchronous Messaging between Processing Modules for Data Replication."
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."
U.S. Appl. No. 16/396,897 filed in the name of Anton Kucherov et al. filed Apr. 29, 2019, and entitled "Storage System with Deduplication-Aware Replication Implemented Using a Standard Storage Command Protocol."
U.S. Appl. No. 16/413,050 filed in the name of Xiangping Chen et al. filed May 15, 2019, and entitled "Storage System with Coordinated Recovery across Multiple Input-Output Journals of Different Types."
U.S. Appl. No. 16/530,121 filed in the name of Anton Kucherov et al. filed Aug. 2, 2019, and entitled "Memory-Efficient Processing of Raid Metadata Bitmaps."
U.S. Appl. No. 16/663,524 filed in the name of Xiangping Chen et al. filed Oct. 25, 2019, and entitled "Storage System with Throughput-Based Timing of Synchronous Replication Recovery."
U.S. Appl. No. 16/665,651 filed in the name of Lior Kamran et al. filed Oct. 28, 2019, and entitled "Recovery Flow with Reduced Address Lock Contention in a Content Addressable Storage System."
U.S. Appl. No. 16/671,824 filed in the name of Lior Kamran et al. filed Nov. 1, 2019, and entitled "Storage System Capacity Expansion Using Mixed-Capacity Storage Devices."
U.S. Appl. No. 16/693,858 filed in the name of Doron Tai filed Nov. 25, 2019, and entitled "Storage System with Prioritized RAID Rebuild."

* cited by examiner

US 11,436,138 B2

ADAPTIVE ENDURANCE TUNING OF SOLID-STATE STORAGE SYSTEM

TECHNICAL FIELD

This disclosure relates generally to storage systems and, more specifically, to techniques for managing solid-state storage systems.

BACKGROUND

The advent of non-volatile solid-state storage such as NAND-flash storage has been a driving force in the state-of-the-art development of high-performance data storage systems. As compared to hard disk drives with rotating platters and mechanically moving components, data storage systems that implement non-volatile solid-state storage have more optimal operating characteristics such as lower power consumption, higher input/output performance, better random I/O performance, etc. However, non-volatile solid-state storage media have a limited endurance and lifetime due to the fact that the memory cells of solid-state storage media gradually wear out over time as a result of slight physical wear that is caused by each program/erase (P/E) cycle of the memory cells. The process of writing data to a solid-state storage device is referred to as program (P), and the process of erasing data from the solid-state storage device is called erase (E), wherein stored data in a memory cell must be erased before new data can be programmed to the memory cell. As such, there is finite life expectancy of a solid-state storage device as a result of the limited number of P/E cycles that the memory cells of the solid-state storage device can withstand before the capability of the memory cells to reliably storage electrical charge is degraded to a point at which the solid-state storage device becomes unstable or unusable.

The endurance of a solid-state storage device is typically quantified by a manufacturer specification referred to as Drive Writes Per Day (DWPD). More specifically, for a solid-state drive (SSD), the DWPD value provides a measure of how many times the entire capacity of the SSD can be written/overwritten per day over a warranty period (i.e., expected lifespan). By way of example, an SSD may have a rated endurance of one (1) DWPD over 5 years. Many types of data storage systems which implement solid-state storage (e.g., enterprise and cloud data storage systems) provide data storage services to many different clients, wherein the clients can have different write loads which can vary over time. For example, there could be periods (e.g., weeks, months, etc.) in which the data storage system has an intensive write load (4 drive writes per day), as well as periods with small write loads (e.g., less than 1 drive writes per day). If the actual DWPD of the solid-state storage is greater, on average, than the manufacture-specified DWPD value, the solid-state storage may wear out more quickly and reduce the lifespan of the solid-state storage below the manufacture-specified lifespan.

SUMMARY

Exemplary embodiments of the disclosure include techniques for automated adaptive endurance tuning of solid-state storage media. For example, an exemplary embodiment includes a method that is performed by a storage control system. The storage control system tracks usage metrics associated with utilization of solid-state storage devices of a storage system, wherein the storage system comprises an amount of over-provisioned capacity allocated in the solid-state storage devices according to an over-provisioning factor. The storage control system determines a current endurance value of the data storage system based at least in part on the usage metrics. The storage control system compares the current endurance value to a target endurance value to determine if the current endurance value differs from the target endurance value. The storage control system automatically adjusts the over-provisioning factor in response to determining a difference between the current endurance value and the target endurance value. The storage control system automatically adjusts the amount of over-provisioned capacity allocated in the solid-state storage devices according to the adjusted over-provisioning factor.

Other embodiments of the disclosure include, without limitation, systems and articles of manufacture comprising processor-readable storage media, which are configured to provide automated adaptive endurance tuning of solid-state storage media.

DETAILED DESCRIPTION

Exemplary embodiments of the disclosure will now be discussed in further detail with regard to systems and methods for automatically adapting an over-provisioning of storage media in a data storage system. For purposes of illustration, exemplary embodiments will be described herein with reference to exemplary information processing systems which implement data processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
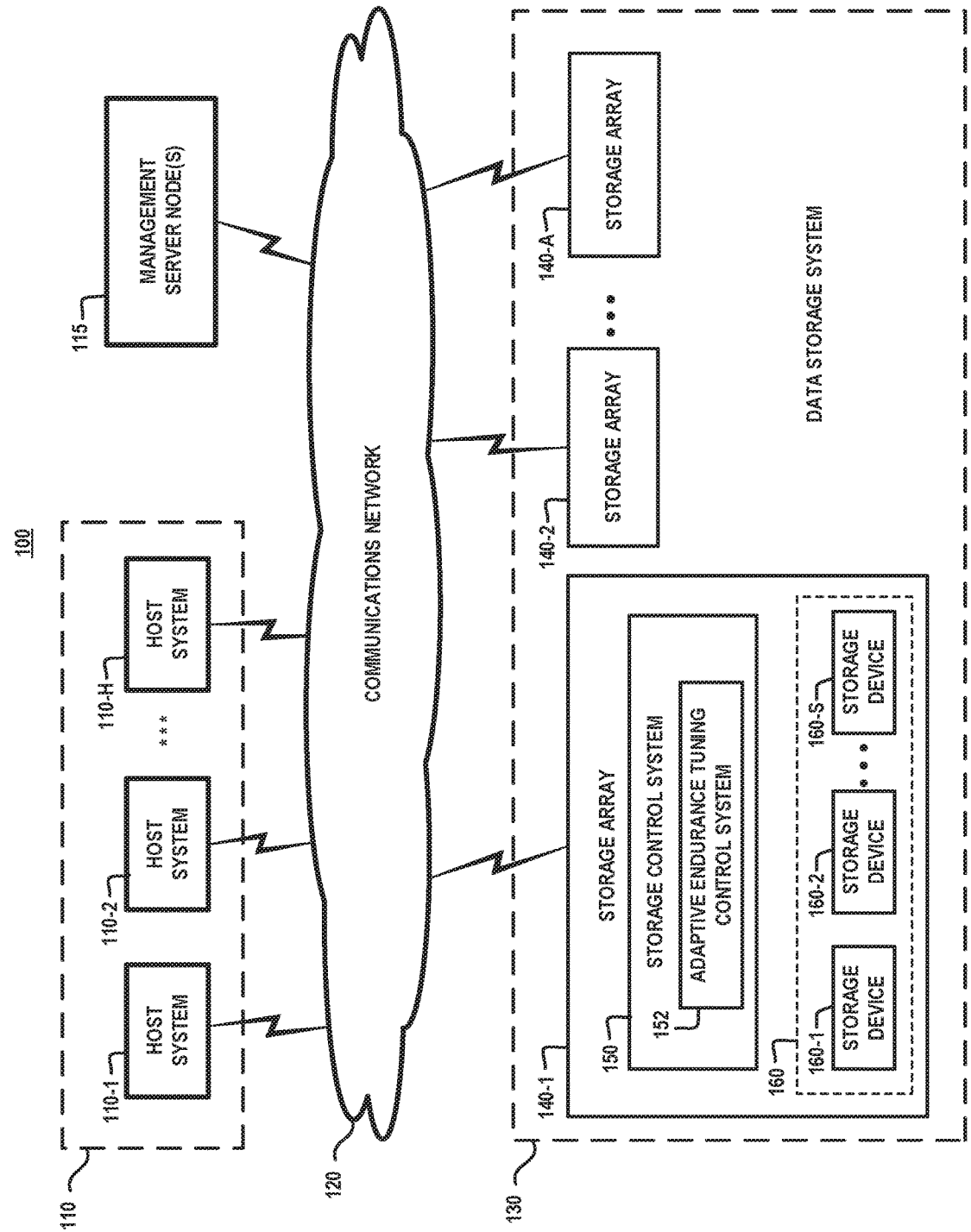
FIG. 1 schematically illustrates an information processing system comprising a data storage system which is configured to implement automated adaptive endurance tuning of solid-state storage media, according to an exemplary embodiment of the disclosure.

FIG. 1 schematically illustrates an information processing system comprising a data storage system which is configured to implement automated adaptive endurance tuning of solid-state storage media, according to an exemplary embodiment of the disclosure. In particular, FIG. 1 schematically illustrates an information processing system 100 which comprises one or more host systems 110-1, 110-2, . . . 110-H (collectively, host systems 110), one or more management server nodes 115, a communications network 120, and a data storage system 130. The data storage system 130 comprises one or more storage arrays 140-1, 140-2, . . . , 140-A (collectively, storage arrays 140). As further illustrated in FIG. 1, the storage array 140-1 comprises a storage control system 150, and a plurality of storage devices 160-1, 160-2, . . . , 160-S (collectively, storage devices 160). The storage control system 150 comprises an adaptive endurance tuning control system 152 and other functional components and modules to provide various functions as will be discussed in further detail below, for example, in conjunction with the exemplary embodiment of FIG. 2.

The host systems 110 comprise physical nodes and/or virtual nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). The host systems 110 can include one or more physical server nodes and/or virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage arrays 140 and (ii) read requests to access data that is stored in one or more of the storage arrays 140.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a distributed data storage system comprising a cluster of the storage arrays 140-1, 140-2, . . . , 140-A, wherein each storage array 140 comprises the same or similar components as the storage array 140-1 shown in FIG. 1. In such embodiments, the addition of more storage arrays allows for scale-out in both performance and capacity of the data storage system 130. In other embodiments, the data storage system 130 may comprise a single storage array (e.g., storage array 140-1), wherein scale-up of capacity can be realized by adding additional storage devices to the storage array. It is to be noted that the storage array 140-1 and its associated storage devices 160 are an example of what is more generally referred to herein as a "storage system."

In some embodiments, each storage array 140 (or storage system) comprises a physical server machine or storage appliance comprising processors and other hardware resources that execute software and firmware to implement the functionality of the storage control system 150, and wherein the storage devices 160 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 160 may be implemented in each storage array 140. In this regard, the term "storage device" as used herein is intended to be broadly construed, so as to encompass, for example, SSDs, HDDs, flash drives, hybrid drives or other types of storage media. The storage control system 150 communicates with the data storage devices 160 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

In some embodiments, in the context of exemplary embodiments for adaptive endurance tuning of solid-state storage devices, the storage devices 160 comprise non-volatile solid-state storage devices which have a finite life expectancy based on the limited P/E endurance of the storage devices 160. For example, in some embodiments, the storage devices 160 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices.

The management server nodes 115 implement application programming interfaces (APIs) to enable manual, automated, and/or semi-automated configuration, provisioning, and monitoring the data storage system 130 and associated storage arrays 140. In some embodiments, the management server nodes 115 comprise stand-alone dedicated management server nodes, which may comprise physical and/or virtual servers that are configured to control operations of the data storage system 130.

The host systems 110 and management server nodes 115 communicate with the data storage system 130 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control/ Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

In some embodiments, the storage arrays 140 of the data storage system 130 are interconnected (via the communications network 120) in a full-mesh network, wherein back-end interconnectivity between the storage control systems 150 of the storage arrays 140 is achieved using, e.g., a redundant high-speed InfiniBand fabric (e.g., 40 Gbps InfiniBand). In some embodiments, the storage arrays 140 utilize remote procedure calls (RPC) for control messages and remote direct memory access (RDMA) for moving data blocks. In some embodiments, the host systems 110 and management server nodes 115 communicate with the storage arrays 140 in a SAN configuration using Ethernet iSCSI and/or Fibre Channel connectivity protocols over the communications network 120.

On each storage array 140, the storage control system 150 comprises a combination of hardware, firmware, and software resources, which are configured to perform various functions including, but not limited to, (i) managing and executing data access requests issued by the host systems 110, (ii) performing various data management and storage services, and (iii) controlling network communication and connectivity, etc. In embodiments where the data storage system 130 comprises a cluster of multiple storage arrays 140, the storage control systems 150 of the storage array cluster will communicate in a cooperative manner to process each data access request received from the host systems 110. Furthermore, in accordance with exemplary embodiments of the disclosure as specifically described herein, the storage control system 150 is configured to adaptively tune the endurance of solid-state storage media in an automated manner to ensure that the overall endurance of the storage system meets or exceeds the manufacture-specified endurance ratings of the solid-state storage.

As explained in further detail below, the storage control system 150 utilizes the adaptive endurance tuning control system 152 to monitor and track usage metrics associated with utilization of solid-state storage devices of a storage system, wherein the storage system comprises an amount of over-provisioned capacity allocated in the solid-state storage devices according to an "over-provisioning factor" (e.g., over-provisioning ratio). The storage control system 150 determines a current endurance value of the data storage system based at least in part on the usage metrics, and compares the current endurance value to a target endurance value to determine if the current endurance value differs from the target endurance value. The storage control system 150 automatically adjusts the over-provisioning factor in response to determining a difference between the current endurance value and the target endurance value, and automatically adjusts the amount of over-provisioned capacity allocated in the solid-state storage devices according to the adjusted over-provisioning factor.

In this manner, storage control system 150 can monitor the wear-level (e.g., write load) of the solid-state storage devices and tune the actual over-provisioning factor in response to periods of write-intensive workloads or read-intensive workloads (or low write workloads) to ensure that the overall endurance of the storage system meets or exceeds a target endurance value (e.g., target DWPD value). The target endurance value can be a manufacture-specified endurance rating of the solid-state storage or a configurable storage system endurance parameter that is set to value which is different (e.g., greater than) the manufacture-specified endurance rating of the solid-state storage.

It is to be appreciated that over-provisioning of a solid-state storage (e.g., NAND flash memory in SSDs, flash memory-based accelerator cards, etc.) serves to enhance the performance and endurance of the solid-state storage. The process of over-provisioning a solid-state storage device comprises allocating a certain amount of the total capacity of the solid-state storage device as "over-provisioned capacity" which can only be accessed by the storage controller (e.g., storage control system 150) and not by the host systems. In particular, the term "over-provisioned capacity" as used herein denotes a portion of the total amount of physical capacity of the solid-state storage device which is held in reserve (and unavailable to a user or host system) for use by a storage controller as additional storage capacity to perform various memory management functions (e.g., garbage collection, wear-leveling, data protection, etc.). The use of over-provisioned capacity provides advantages including, but not limited to, enhancing the endurance of the solid-state storage, improving wear-leveling and random write performance, decreasing a write amplification factor (WAF), and other advantage that lead to improving the endurance of solid-state storage such as NAND-based SSDs.

In some embodiments, an over-provisioning factor is denoted by an over-provisioning (OP) ratio, which is determined as follows:

$$OP\ \text{Ratio} = \frac{(\text{Physical Capacity} - \text{User Capacity})}{\text{User Capacity}}, \quad\quad (\text{EQN. 1})$$

wherein the "physical capacity" represents a total capacity of the solid-state storage (e.g., total capacity of an SSD drive) and the "user capacity" represents the amount of capacity that is accessible by the hosts. For example, for a solid-state storage device having a total physical capacity of 128 Gigabytes (GB) with 120 GB allocated as user capacity and 8 GB allocated as over-provisioned capacity, the solid-state storage device would have an OP ratio of 0.067 (which is approximately 7%). As a further example, for a solid-state storage device having a total physical capacity of 128 GB with 100 GB allocated as user capacity and 28 GB allocated as over-provisioned capacity, the solid-state storage device would have an OP ratio of 0.28 (or 28%). A lower OP ratio (e.g., 7% or less) can be sufficient for a read-intensive workload, while a higher IP ratio (e.g., 28% or higher) can be sufficient for a write-intensive workload.

As noted above, the endurance of solid-state storage such as an SSD is typically quantified by a DWPD value, which is a manufacturer specification that provides an estimated measure of how many times the entire capacity of the SSD can be written/overwritten per day over the expected lifespan (or warranty period) of the SSD. The DWPD specification for a given SSD is based on various factors such as the P/E endurance of the memory cells and the storage architecture (e.g., SLC, MLC, TLC, QLC, etc.), the total storage capacity of the SSD and the manufacture-configured over-provisioning of the SSD, and an expected target "write amplification" factor. For example, in some embodiments, a DWPD value is determined as follows:

$$DWPD = PE \times \left( \frac{1+OP}{EOL \times WA} \right), \quad \text{(EQN. 2)}$$

where: (i) PE denotes a maximum number of P/E cycles (per block) of the solid-state storage (e.g., typically 100K per block SLC, 30K per block for MLC, 7K per block for TLC, and 1K per block for QLC); (ii) OP denotes an over-provisioning ratio (e.g., EQN. 1); (iii) EOL denotes a total number of days for the drive "end of life" (e.g., typically 5 years×365.25 days); and (iv) WA denotes an estimated "write amplification" (WA) factor for the given OP ratio (wherein WA is typically estimated based on a 100% 4 KB random write workload).

As is known in the art, write amplification is a phenomenon that occurs when one host write at the user or application layer results in multiple writes at the physical device layer. Such write amplification is undesirable because the actual amount of data written to a solid-state storage device is greater than the amount the host intended to write, thereby leading to further wear of the solid-state storage device. The write amplification factor (WAF) is determined as:

$$WAF = \frac{\text{Amount of Physical Writes}}{\text{Amount of Host Writes}}, \quad \text{(EQN. 3)}$$

where the "amount of host writes" denotes the amount of data that is sent from the host to the storage control system in connection with write requests, and the "amount of physical writes" denotes the amount of data that is actually written to the solid-state storage device by the storage control system as a result of executing the host write requests and performing associated management functions. It is desirable to maintain the WAF as low as possible (e.g., close to 1.0) to minimize the added wear caused by write amplification and thus enhance the endurance and lifetime of the solid-state storage. In some embodiments, the storage control system can implement inline data compression techniques to store data in compressed form, which helps reduce the effective write amplification factor.

There are many causes of write amplification including, e.g., rearranging data on the solid-state storage device in connection with P/E operations (e.g., garbage collection), maintaining and updating metadata, and performing other types of data management functions that are commonly implemented by the storage controller. During real-time operation of a solid-state storage device with a fixed factory amount of over-provisioned capacity, an increase in the WAF value indicates that undesirable write amplification is increasing, whereby the actual lifetime of the solid-state storage device may be shortened before reaching the warrantied total bytes written (TBW). An increase in the amount of over-provisioned capacity will serve to decrease write amplification by improving the efficiency of the internal data management operations, as well as increase in the number of daily writes per day (DWPD) during the manufacture warranty period.

Typically, the manufacture of a solid-state storage device (e.g., SSD drive) will reserve a portion of the total storage capacity as over-provisioned capacity during factory configuration and firmware programming. The factory over-provisioned capacity set by the manufacturer for a given solid-state storage device will vary in size depending on various factors such as, e.g., the total capacity of the solid-state storage device, the type of application for which the solid-state storage device will be utilized (e.g., read-intensive applications or write-intensive applications). A read-intensive application is one in which typical client workloads are dominated by reads (e.g., 20% writes and 80% reads), while a write-intensive application is one in which typical client workloads are dominated by writes (e.g., 20% reads and 80% writes). For example, an enterprise application using a solid-state storage device for read caching can be considered a read-intensive application, while a database application can be considered a write-intensive application. While a factory-configured over-provisioning for a solid-state storage device may be sufficient for an anticipated write workload, the fixed over-overprovisioning capacity configuration may not be sufficient for the actual write workload during real-time use of the solid-state storage device, wherein the actual write workload is greater than the anticipated workload, resulting in additional wear and reducing the lifespan of the solid-state storage device.

Figure 2:
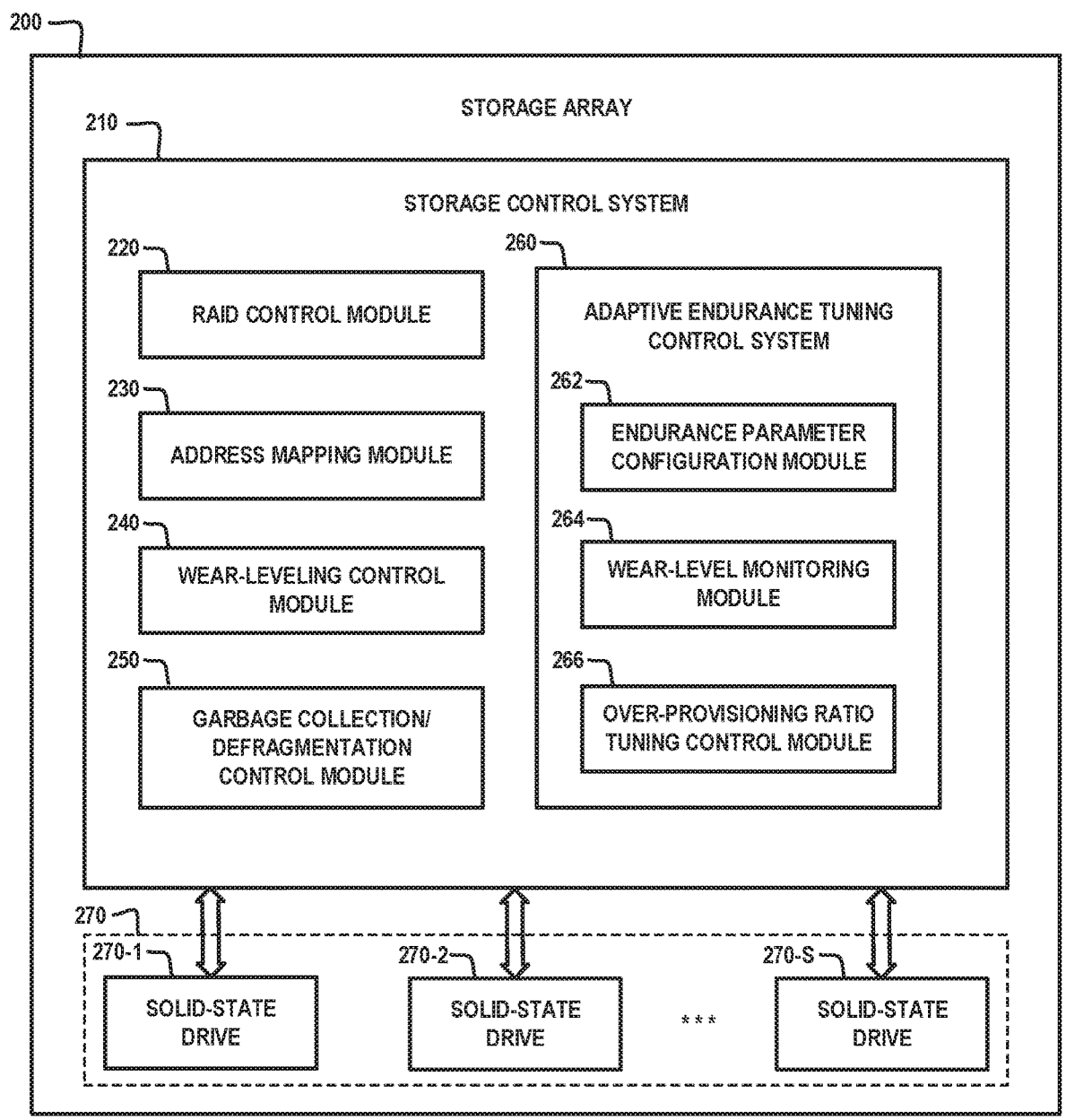
FIG. 2 schematically illustrates a storage system which is configured to implement automated adaptive endurance tuning of solid-state storage media, according to an exemplary embodiment of the disclosure.

FIG. 2 schematically illustrates a storage system which is configured to implement automated adaptive endurance tuning of solid-state storage media, according to an exemplary embodiment of the disclosure. More specifically, FIG. 2 schematically illustrates an exemplary framework of a storage array 200 which can be implemented for the storage arrays 140 in the data storage system 130 of FIG. 1. The storage array 200 (alternatively referred to as storage system 200) comprises a storage control system 210 which comprises a RAID control module 220, an address mapping module 230, a wear-leveling control module 240, a garbage collection/defragmentation control module 250, and an adaptive endurance tuning control system 260. The adaptive endurance tuning control system 260 comprises an endurance parameter configuration module 262, a wear-level monitoring module 264, and an over-provisioning ratio tuning control module 266. The storage array 200 further comprises an SSD drive array enclosure 270 comprising a plurality of solid-state drives 270-1, 270-2, . . . , 270-S (collectively referred to as SSD array 270). The SSD array 270 can be coupled to the storage control system 210 using redundant interconnects that are implemented using any suitable standard interface such as SAS, SATA, PCI-Express, etc.

Figure 3:
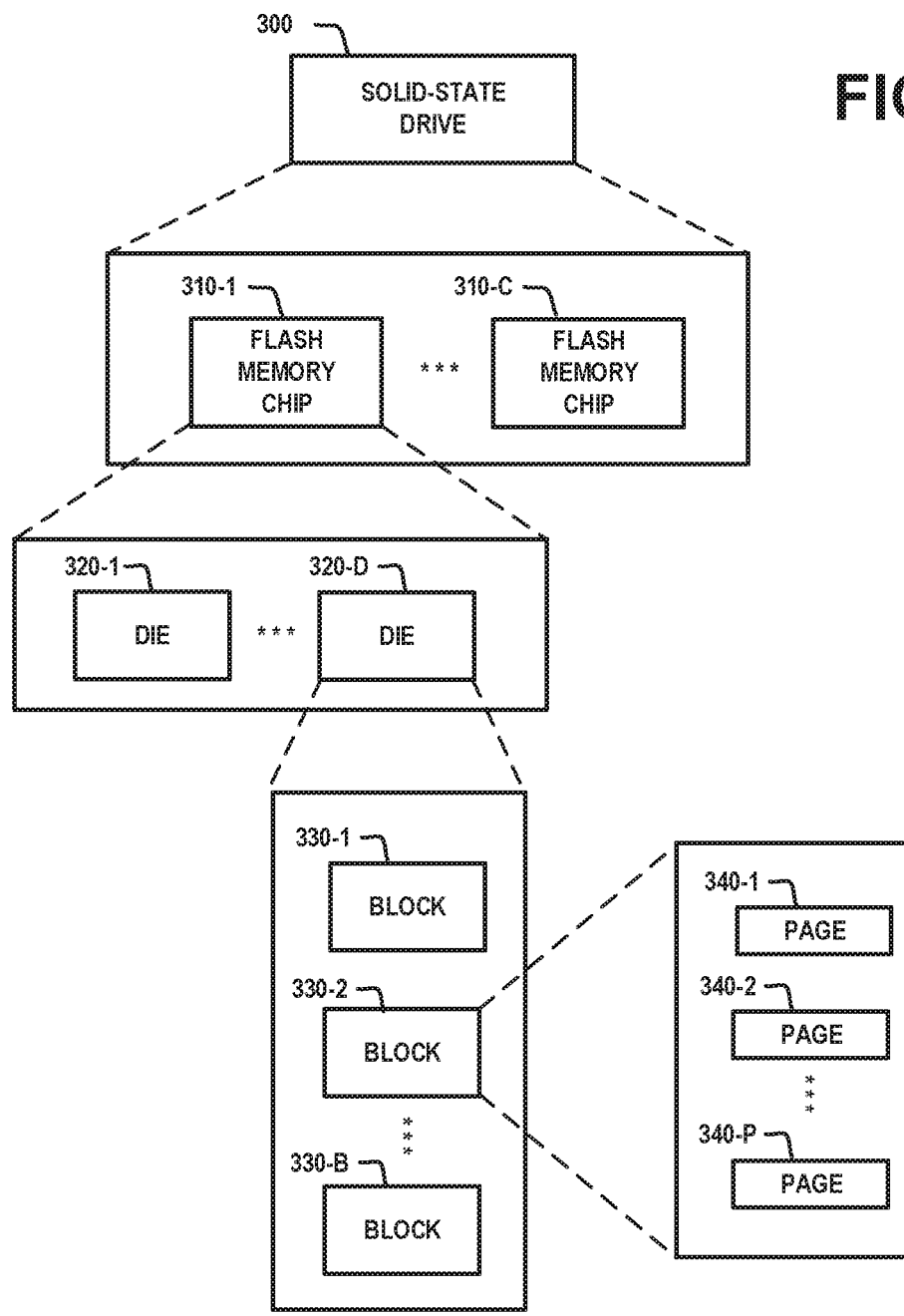
FIG. 3 schematically illustrates an architecture of a solid-state drive which can be implemented in a storage system which is configured to implement automated adaptive endurance tuning of solid-state storage media, according to an exemplary embodiment of the disclosure.

FIG. 3 schematically illustrates an architecture of a solid-state drive which can be implemented in a storage system, according to an exemplary embodiment of the disclosure. More specifically, FIG. 3 schematically illustrates an exemplary framework of a solid-state drive 300 which can be implemented for the solid-state drives of the SSD array 270 of FIG. 2. As schematically illustrated in exemplary embodiment of FIG. 3, the solid-state drive 300 comprises a plurality of flash memory chips 310-1, . . . , 310-C, which are typically organized in an interleaved manner and accessed by the storage controller using different dedicated channels to enable parallel access to data. For example, an SSD controller can be connected to 4 flash memory chips using four parallel channels, whereby data transfer and read or write operations can be performed on different flash memory chips simultaneously.

Figure 4:
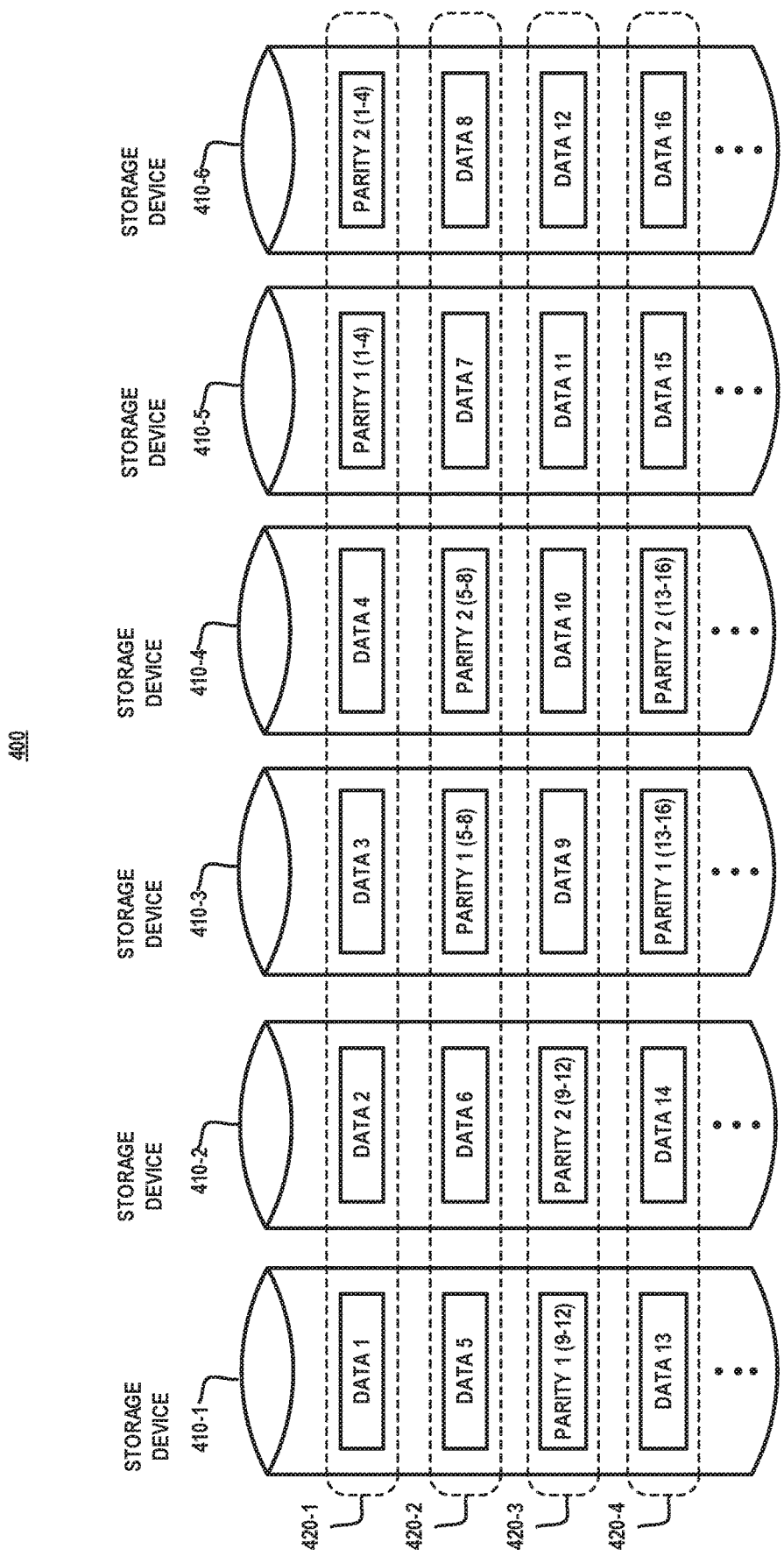
FIG. 4 schematically illustrates a Redundant Array of Independent Drives (RAID) 6 configuration which can be implemented in the data storage systems of FIGS. 1 and 2, according to an exemplary embodiment of the disclosure.

As further shown in FIG. 4, each flash memory chip 310-1, . . . , 310-C chip includes a plurality of dies 320-1, . . . , 320-D, which share a multiplexed interface (e.g., serial I/O bus). Each die 320-1, . . . , 320-D comprises an array of memory cells that are grouped into a plurality of blocks 330-1, 330-2, . . . , 330-B, wherein each block comprises a plurality of pages 340-1, 340-2, . . . , 340-P. Typically, the blocks 330-1, 330-2, . . . , 330-B of each die 320-1, . . . , 320-D are divided/organized into multiple planes (e.g., 2 or 4 planes), wherein each plane comprises a portion of the total number blocks 330-1, 330-2, . . . , 330-B. By way of example, each die 320-1, . . . , 320-D can have a total of 4096 blocks organized among 2 planes of 2048 blocks. The dies 320-1, . . . , 320-D can operate independently and perform operations involving one or two planes.

Furthermore, in some embodiments, each block 330-1, 330-2, . . . , 330-B comprises a same number of pages (e.g., typically 64, 128, or 256 pages). Each page 340-1, 340-2, . . . , 340-P has a same page size, wherein common pages sizes include 2 KB, 4 KB, 8 KB, or 16 KB. In some embodiments each die 320-1, . . . , 320-D further comprises registers (e.g., data register, cache register), wherein each register has a same size as the page size of the pages. In addition, each page can include a dedicated region to store metadata such as identification and error-detection information.

As is known in the art, solid-state storage media such as NAND flash media allows data to be written or read on a page level, but does not allow existing data to be overwritten. In particular, while data can be written to an empty page, a page with existing data cannot be overwritten. Instead, a given block of flash memory must first be erased (E) before any new pages can be written (programmed P) to the given block. By way of example, if a given programmed page of data of a given block has to be modified, the following process must be performed: (i) the page data of the entire block (i.e., valid pages of the block) is read into a temporary memory (e.g., a block located in over-provisioned capacity); (ii) an erase operation is performed to delete the existing data of the given block; (iii) a programming operation is performed to rewrite the previous data of the block plus the updated page content to the block, thereby resulting in the new block contents being programmed to the same block address. Furthermore, with NAND flash memory, free space can be created by reclaiming blocks of flash memory which include pages with stale (invalid) data using a process referred to as "garbage collection" or defragmentation, as explained in further detail below.

Referring back to FIG. 2, the RAID control module 220 implements methods that are configured to distribute, organize, and manage data across multiple solid-state drives to implement a RAID array according to a given RAID level configuration (e.g., RAID 1, RAID 6, etc.). In some embodiments, the RAID control module 220 is configured to manage a RAID array which comprises multiple local solid-state drives of the SSD array enclosure 270 that are managed by the storage control system 210. In some embodiments, the RAID control module 220 cooperates with the RAID control modules of other storage arrays within a cluster to implement a RAID array which comprises a plurality of solid-state drives across different storage arrays. In some embodiments, the RAID control module 220 comprises a software module of the storage control system 210, in which the RAID functionality is executed using the operating system and existing hardware of the host data storage system 200.

The RAID control module 220 is configured to control and manage the organization of data in a given RAID array using RAID storage techniques such as striping, mirroring, parity, and combinations thereof, depending on the given RAID level configuration. In particular, the RAID control module 220 implements data striping methods that are configured to support RAID schemes which implement data striping techniques to distribute data over a plurality of solid-state drives of a RAID array. In particular, the data striping methods are configured to divide data into resiliency units called "stripes" and divide the stripes into equal-sized data blocks, referred to as "strips," wherein the strips are stored on different solid-state drives within the RAID array. In addition, the RAID control module 220 implements parity computing methods that are configured to support parity-based RAID schemes. The parity computing methods are configured to compute parity data (for, e.g., data stripes) using one or more types of parity functions (e.g., eXclusive OR (XOR) function, etc.). The types of parity functions that are implemented will depend on the RAID level configurations that are supported by the RAID control module 220. The RAID control module 220 implements methods for rebuilding of spare capacity in the event of one or more failures of a given RAID array (e.g., failure of a single solid-state drive in the given RAID array, or failure of a given storage array which includes a solid-state drive that is implemented in the given RAID array, etc.).

As is known in the art, different RAID levels have different fault tolerances, data redundancies, and performance characteristics and properties. While exemplary embodiments of the disclosure can be implemented using various types of RAID level configurations, for illustrative purposes, exemplary embodiments will be discussed in the context of a RAID 6 level implementation. In general, RAID 6 utilizes a combination of block level data striping and distributed parity techniques to provide resiliency and error correction in the event of a failure (e.g., failure of a solid-state drive). The process of data striping for RAID 6 comprises dividing stored data into resiliency units which are referred to as "stripes" and further dividing the data "stripes" into a plurality of equal-sized data blocks referred to as "strips." The constituent strips of a given stripe are stored in a given order on different storage devices (e.g., solid-state drives) within the RAID array.

In addition, parity data blocks are computed for each of the data stripes and written to a data storage device within the RAID array. The parity data blocks for the data stripes are not written to a single storage device but are distributed across all the storage devices within the RAID array. The parity data block for a given data stripe can be used to recalculate the data of a constituent data strip in the event that the constituent data strip is lost due to a storage device failure. RAID 6 utilizes two independent parity functions to compute two different parity data blocks for a given data stripe, which are written to two separate storage devices within the RAID 6 array. RAID 6 requires a minimum of four storage devices.

For example, FIG. 4 schematically illustrates a RAID 6 configuration 400 which can be implemented in the data storage systems of FIGS. 1 and 2, according to an exemplary embodiment of the disclosure. In particular, as shown in FIG. 4, the RAID 6 configuration 400 comprises six storage devices 410-1, 410-2, 410-3, 410-4, 410-5, and 410-6 (collectively, storage devices 410). In some embodiments, in the context of the exemplary embodiment of FIG. 2, each storage device 410-1, 410-2, 410-3, 410-4, 410-5, and 410-6 comprises a different solid-state drive within the SSD array 270 of the storage array 220. In other embodiments, each storage device 410-1, 410-2, 410-3, 410-4, 410-5, and 410-6 comprises a different solid-state drive 270 within two or more storage arrays within a cluster. The RAID 6 configuration 400 can be implemented to protect user data and some system metadata. The RAID 6 configuration 400 can be organized in grids (matrices) of 16 KB blocks, with N rows and K columns referred to as "stripes." Each column is a separate physical solid-state drive, where 4 data columns are used to store data strips, and two columns are used to store associated parity data strips, e.g., PQ parity data, wherein the parity data strips P are computed, for example, by performing logical XOR operations across the data columns, and wherein parity data strips Q are computed by encoding diagonals in the matrix of stripes.

In the exemplary embodiment of FIG. 4, for ease of illustration, four individual RAID 6 stripes 420-1, 420-2, 420-3, and 420-4 are shown, wherein each RAID stripe 420-1, 420-2, 420-3, and 420-4 comprises 4 data strips and 2 parity strips. In some embodiments, the size of each strip is the page size (e.g., 4 KB) of the solid-state storage. In particular, the RAID stripe 420-1 comprises four data strips DATA 1, DATA 2, DATA 3, and DATA 4, and two independent parity strips PARITY 1 and PARITY 2 for the data strips DATA (1-4). The RAID stripe 420-2 comprises four data strips DATA 5, DATA 6, DATA 7, and DATA 8, and two independent parity strips PARITY 1 and PARITY 2 for the data strips DATA (5-8). The RAID stripe 420-3 comprises four data strips DATA 9, DATA 10, DATA 11, and DATA 12, and two independent parity strips PARITY 1 and PARITY 2 for the data strips DATA (9-12). The RAID stripe 420-4 comprises four data strips DATA 13, DATA 14, DATA 15, and DATA 16, and two independent parity strips PARITY 1 and PARITY 2 for the data strips DATA (15-16).

While FIG. 4 illustrates an exemplary RAID 6 layout for the data blocks and parity data blocks, different RAID 6 layout schemes can be implemented which specify different orders and locations in which the constituent data blocks (strips) and associated parity data blocks for the data blocks (stripes) are written to the storage devices 410-1, 410-2, 410-3, 410-4, 410-5, and 410-6 within the RAID 6 configuration 400. The RAID 6 configuration 400 provide resiliency and data protection in the event a maximum of two failures of the storage devices.

Referring back to FIG. 2, the address mapping module 230 implements methods that are configured to translate a logical block address (LBA) offset provided by a host system into a physical location (physical offset address) on the solid-state drives. In particular, the address mapping module 230 essentially comprises a "flash translation layer" (FTL) which operates below a file system that maps host side or file system LBAs to the physical address of the flash memory (logical-to-physical mapping). Each LBA that is managed by the file system is mapped to a physical location (e.g., block ID, page ID and sector ID) of the solid-state storage device. The specific address mapping process that is implemented can vary depending on the given application.

The wear-leveling control module 240 implements wear-leveling methods that are configured to distribute P/E cycles evenly across all blocks of a solid-state storage device. The wear-leveling control module 240 is configured to determine which physical block to use for storing data. For example, the wear-leveling control module 240 can determine which block, among a plurality of erased blocks, has a lowest erase count, and then utilize the determined block for a next write operation. In other embodiments, the wear-leveling control module 240 can implement a static wear leveling operation by selecting a given block which has valid data, if the P/E count for given block fall below a given threshold. The valid data for the selected block is then moved to another block, and the selected block is then erased and programmed with the data associated with the write operation. The wear-leveling techniques are utilized to ensure that some flash memory blocks are not programmed and erased on regular basis more than other flash memory blocks, so that one or more flash memory blocks do not wear out before all the other flash memory blocks and, thus, prematurely end the life of the flash memory device.

The garbage collection/defragmentation control module 250 implements methods that are configured to reclaim blocks with invalid pages into free blocks. As data pages are randomly written in a solid-state storage device, the LBAs being updated are distributed across all blocks of the solid-state storage device. This random writing of data pages can result in a number of blocks having a combination of invalid data pages and valid data pages, or blocks having all invalid data pages. The garbage collection process is performed to essentially perform a defragmentation of the user capacity of the solid-state storage device. A garbage collection process can trigger various operations (reads/writes/erases) on the solid-state storage device, which can result in considerable execution time.

In some embodiments, the garbage collection process can be implemented synchronously in response to receiving a write request when there is insufficient user capacity (or a minimum threshold amount of user capacity is reached) to process the write request, to thereby reclaim blocks into free blocks which can be used to process the write request. In other embodiments, the garbage collection process can be performed asynchronously, in the background, to recycle invalid capacity into free capacity during periods of idle time between the data access requests sent to the storage system.

In general, garbage collection/defragmentation control module 250 will select one or more "victim blocks" to erase. A given block which has entirely invalid data pages can be selected as a victim block. In this instance, the block can be erased without having to read and write valid data pages of the victim block to another block. A given block which has both invalid data pages and valid data pages can be selected as a victim block. In this instance, the valid data pages must be copied to another block, and the address mapping information is updated. Once the copying is complete, the victim block can be erased. Various techniques can be implemented to select victim blocks for the garbage collection/defragmentation process including, e.g., greedy techniques which are based on a number of invalid pages within the target blocks that are considered for selection as victim blocks, or other techniques that take into account a combination of factors including, but not limited to, the number of invalid pages within the target blocks, and an estimated wear-level of the target blocks that are considered for selection as victim blocks.

The storage control system 210 will have knowledge of which pages or blocks are invalid in response to TRIM commands or UNMAP commands received from the host operating system. Such commands instruct the storage control system 210 when a given block is invalid or when a given page within a block is invalid. These commands essentially serve to release space of the solid-state storage devices, and allow the storage control system 210 to reclaim the released space at the array level. In particular, these commands allow the storage control system 210 to know which blocks and pages are deemed by the host to be invalid (or stale), and allows the storage control system 210 to skip rewriting invalid data pages of a given block when the block is being erased as part of, e.g., a garbage collection process.

In some embodiments, the allocated over-provisioned capacity can be utilized by the garbage collection/defragmentation control module 250 as temporary workspace to manage the scheduling of valid page merge operations, wherein the valid pages of one or more victim blocks are copied into free pages in the over-provisioned capacity, which is then followed by writing the valid pages from the over-provisioned capacity into free pages of blocks of the user capacity at some later scheduled time (during a period of low I/O activity) before erasing and reclaiming the victim blocks of the user capacity. In some embodiments, reclaimed pages and blocks can be tagged for inclusion into the over-provisioned capacity in instances when the over-provisioning factor is increased by the adaptive endurance tuning control system 260.

The adaptive endurance tuning control system 260 implements the same or similar functions as the adaptive endurance tuning control system 152 of FIG. 1, as discussed above. The endurance parameter configuration module 262 implements methods to set (manually and/or automatically) a configurable endurance parameter for the solid-state storage system 270 to a target endurance value. The endurance value of the solid-state storage can be quantified using various one of many types of endurance metrics. For example, in some embodiments, the endurance parameter configuration module 262 is configured to set a configurable DWPD parameter to a target DWPD value. As noted above, the DWPD metric provides a measure of how many times the entire capacity of a solid-state storage device, such as an SSD drive, can be written/overwritten per day over a manufacture warranty period (i.e., manufacture-specified lifespan).

Furthermore, in some embodiments, the endurance parameter configuration module 262 is configured to set a configurable TBW (total bytes written) parameter for the storage system to a target TBW value. The TBW value (in terabytes (TB) or petabytes (PB)) provides a measure of how much data can be cumulatively written into the SSD drive over the manufacture-specified lifespan before the SSD drive potentially becomes unstable or unusable. For example, if an SSD drive is rated for a TBW of 400 terabytes, this means that 400 terabytes can be written to the SSD drive before the SSD drive potentially become unstable/unusable. Assuming the manufacture-specified lifespan of the SSD drive is 5 years, the 400 terabytes TBW specification converts to approximately (400 TB/[5*365]) 220 GB of writes per day over the 5-year warranty period. The TBW value can be translated into a DWPD value by: DWPD=TBW (in TB)/(365×Warranty (in Years)×Capacity (in TB)).

In some embodiments, the endurance parameter configuration module 262 is configured to set the configurable endurance parameter (e.g., configurable DWPD parameter or TBW parameter) to a target endurance value which is specified by a system administrator using an API of a management node (e.g., management server nodes 115, FIG. 1). For example, the configurable endurance parameter can be set to a target endurance value which is equivalent, by default, to the manufacture-specified endurance value of the SSD drives 270 of the storage array 200. The configurable endurance parameter can be set to a target (user-specified) endurance value which is greater than the manufacture-specified endurance value of SSD array 270 of the storage array 200. This allows the storage system to automatically adjust/tune the OP ratio in a way that achieves an improved endurance and longer lifespan of the SSD drives 270 over the manufacture-specified endurance metric and lifespan of the SSD drives 270.

In other embodiments, the endurance parameter configuration module 262 is configured to dynamically adjust/tune the configurable endurance parameter (e.g., configurable DWPD or TBW parameter) to a target endurance value which falls within a specified range of endurance values (i.e., minimum endurance value, maximum endurance value).

The wear-level monitoring module 264 implements methods that are configured to monitor the wear-level of the individual solid-state drives by tracking usage metrics associated with utilization of the individual solid-state drives 270-1, 270-2, . . . , 270-S, and periodically determine a current endurance value of the array of solid-state drives 270 based at least in part on the usage metrics, wherein the current endurance value provides a measure of an overall wear-level of the solid-state drives 270-1, 270-2, . . . , 270-S.

More specifically, in some embodiments, the wear-level monitoring module 264 monitors the actual utilization of the solid-state drives 270 and maintains various types of usage metrics (e.g., attributes, statistics) which are commonly utilized to determine how much wear has been endured by the solid-state storage devices under real-time workloads. For example, the usage metrics can include information such as, e.g., read/write ratios associated with read operations and write operations performed by the solid-state storage devices, program/erase cycle counts (or wear-level counts) for blocks of the solid-state storage devices to determine how many write cycles are remaining for each block, a count of hours in a power-on state, average write workload, amount of data written per day, computed variables such as a remaining lifespan of solid-state storage, percentage of rated lifespan used, etc., and various other types of attributes and statistics that are suitable for use in determining a current wear-level of the solid-state storage.

By way of specific example, the wear-level monitoring module 264 can determine a current WAF of the storage system by monitoring and utilizing an attribute value that tracks a "total amount of LBAs written" and an attribute value that tracks a "total amount of NAND writes," and then estimate the current WAF using EQN. 3. In addition, the wear-level monitoring module 264 can track one or more attributes that allow the wear-level monitoring module 264 to determine an average P/E cycle count for each solid-state drive 270-1, 270-2, . . . , 270-S based on the P/E counts (e.g. counter of block erases) of the blocks of each solid-state drive 270-1, 270-2, . . . , 270-S, and thereby estimate an overall average P/E count for the SSD drive array 270. The estimated values of the average P/E cycle count and the WAF, together with a current OP ratio, can be utilized, for example, to estimate the current DWPD endurance value using EQN. 3.

The wear-level monitoring module 264 utilizes the wear-level data to periodically determine a current overall wear-level of the array of solid-state drives 270. In some embodiments, the overall wear-level is determined as a current average number of drive writes per day (average DWPD), or a current average amount of gigabytes written per day, etc. In some embodiments, the overall wear-level is determined on a periodic basis (e.g., hourly, daily, weekly, etc.) depending on the known or anticipated amount of utilization of the solid-state storage system.

The over-provisioning ratio tuning control module 266 implements methods that are configured to adaptively tune an over-provisioning factor (e.g., OP ratio, EQN. 1), and thus dynamically change the amount of over-provisioned capacity of the solid-state drives 270-1, 270-2, . . . , 270-S to ensure that the actual overall endurance of the SSD array 270 meets or exceeds the target endurance parameter value under different write workloads (e.g., write-intensive workloads, low write workloads, read-intensive workloads, etc.).

In some embodiments, the over-provisioning ratio tuning control module 266 is configured to perform functions such as (i) comparing the determined wear-level (as determined by the wear-level monitoring module 264) to the current target endurance value (e.g., target DWPD value), (ii) automatically adjusting (increase or decrease) the over-provisioning factor (e.g., OP ratio) of the solid-state drives 270-1, 270-2, . . . , 270-S based on the comparison results, and (iii) executing commands to cause the over-provisioned capacity of the solid-state drives 270-1, 270-2, . . . , 270-S to be adjusted (increased or decreased) based on the adjustment to the over-provisioning factor.

It is to be understood that the storage control system 210 of FIG. 2 is generically depicted with regard to various functions that are provided by the storage control system 210. The storage control system 210 can be configured to implement other functions including, but not limited to, inline data compression/decompression, data deduplication, data replication, snapshots, thin provisioning, and other types of data management functions, depending on the system configuration. The various functional modules of the storage control system 210 are implemented using a combination of hardware, firmware, and software. In some embodiments, the storage array 200 is storage system that is implement on a server machine or a custom dedicated storage appliance. The storage array 200 comprises a plurality of storage control processors which execute an operating system, which runs on top of, e.g., a customized lightweight Linux kernel, to manage the functional modules of the storage system 200, and network communication operations, etc.

Figure 5:
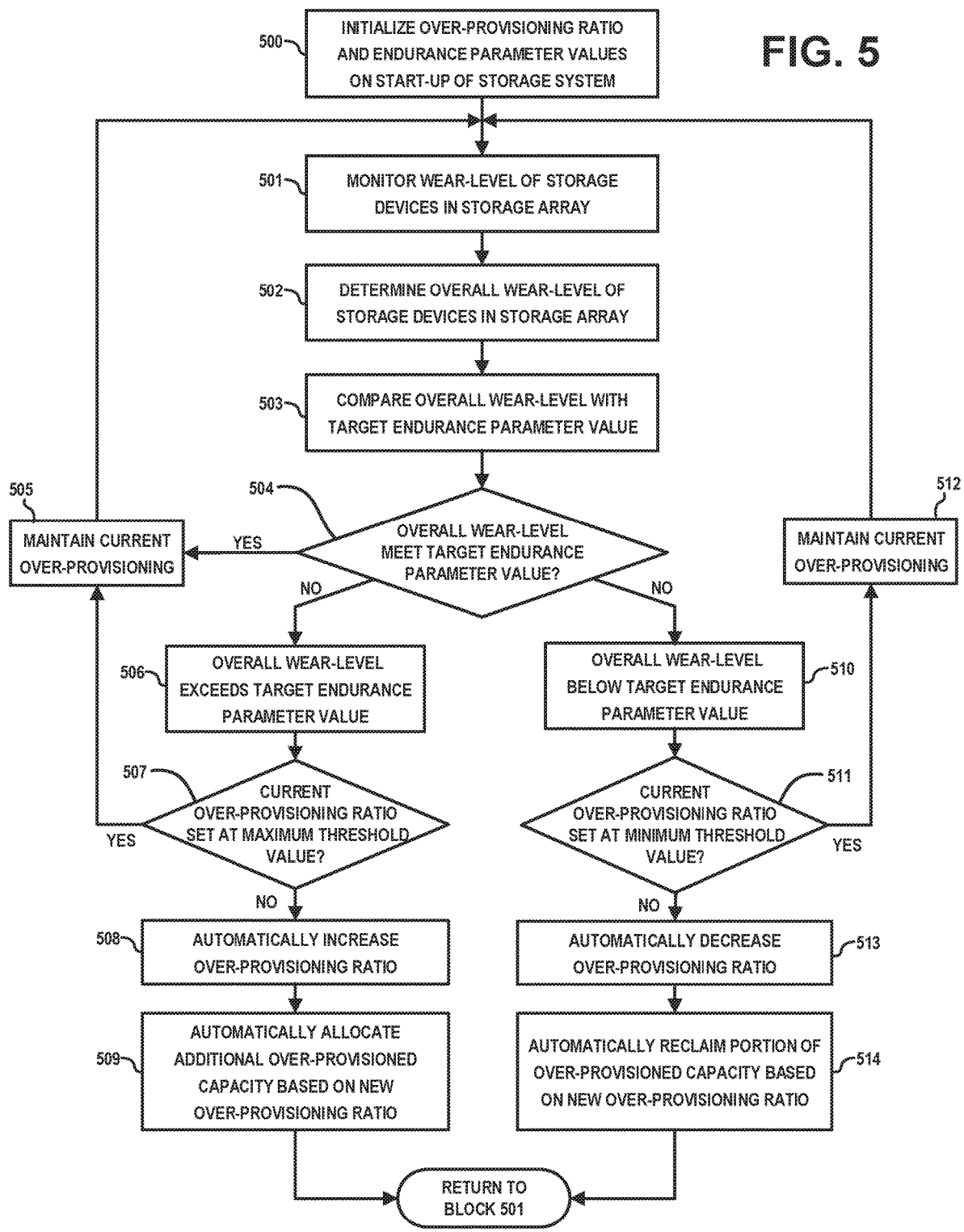
FIG. 5 is a flow diagram of a method to implement automated adaptive endurance tuning of solid-state storage media, according to an exemplary embodiment of the disclosure.

FIG. 5 is a flow diagram of a method to implement automated adaptive endurance tuning of solid-state storage media, according to an exemplary embodiment of the disclosure. In some embodiments, FIG. 5 illustrates modes of operation of the storage control system 210 of FIG. 2 and, thus, for illustrative purposes, the process flow of FIG. 5 will be discussed in the context of the exemplary embodiment of the storage system 200 of FIG. 2. On start-up of the storage system 200, the storage control system 210 will initialize a target over-provisioning ratio value and a target endurance parameter value (block 500). In particular, as noted above, the adaptive enduring tuning control system 260 manages a configurable endurance parameter (e.g., configurable DWPD parameter) which can be set to a target endurance value on start-up of the storage system 200, and then adjusted over time according to the operating parameters of the data storage system. For example, the initial target endurance value can be specified by a system administrator to be an endurance value which is equal to or greater than the manufacture-specified endurance value of the solid-state storage devices (e.g., SSD array 270) implemented in the storage system.

Furthermore, the adaptive endurance tuning control system 260 manages a configurable over-provisioning ratio parameter which can be tuned to a target OP ratio value in a range from a predefined minimum OP ratio threshold value (e.g., about 0.02) to a predefined maximum OP ratio threshold value (e.g., about 0.40). In some embodiments, on start-up, the adaptive endurance tuning control system 260 will set the target OP ratio threshold value to the predefined maximum OP ratio value, and report the minimal available capacity to the host systems. The storage control system 210 will allocate over-provisioned capacity of the solid-state storage devices of the storage system 200 based on the target over-provisioning ratio using known techniques. In some embodiments, over-provisioned capacity is allocated by reserving free RAID stripes (e.g., RAID 6 stripes).

During operation of the storage system 200, the storage control system 210 will monitor the wear-level of the solid-state storage devices (block 501) by monitoring and tracking various types of usage metrics (e.g., attributes, statistics, etc.) associated with utilization of the solid-state storage devices of the storage system 200, as discussed above. The storage control system 210 utilizes the usage metrics to periodically determine a current overall wear-level of the array of solid-state storage devices (block 502). For example, in some embodiments, the storage control system 210 will periodically determine an overall wear-level of the array of solid-state storage devices based on, e.g., a current average number of drive writes per day (average DWPD), or a current average amount of gigabytes written per day, etc. As noted above, in some embodiments, the overall wear-level is determined on a periodic basis (e.g., hourly, daily, weekly, etc.) depending on the known or anticipated amount of utilization of the storage system.

The storage control system 210 compares the current overall wear-level of the solid-state storage devices with the target endurance parameter value (e.g., target DWPD, target TBW, etc.) to determine if the current overall wear-level meets, exceeds, or falls below the target endurance parameter value (block 503). When the storage control system 210 determines that the current overall wear-level of the solid-state storage devices meets the target endurance parameter value (affirmative determination in block 504), the storage control system 210 will maintain the currently configured over-provisioning ratio for the solid-state storage devices (block 505), and then continue to monitor wear level and periodically determine a current overall wear-level of the array of solid-state storage devices. It is to be understood that "meeting the target endurance parameter" means that the current overall wear-level of the solid-state storage array 270 is substantially the same as the target endurance parameter value within a given margin of difference, e.g., to some maximum percentage (e.g., 1%) less than or greater than the target endurance parameter value.

On the other hand, when the storage control system 210 determines that the current overall wear-level of the array of solid-state storage devices does not meet the target endurance parameter value (negative determination in block 504), the storage control system 210 can proceed to adaptively tune the over-provisioning ratio. For example, when the storage control system 210 determines that the current overall wear-level of the array of solid-state storage devices exceeds the target endurance parameter value (block 506), the storage control system 210 will determine if the current over-provisioning ratio is set at the maximum OP threshold value (block 507). The current overall wear-level of the array of solid-state storage devices can increase during extended periods of "write-intensive" workloads. If the current over-provisioning ratio is determined to be set at the maximum OP threshold value (affirmative determination in block 507), the storage control system 210 will maintain the current over-provisioning ratio at its current maximum threshold amount (block 505).

On the other hand, if the storage control system 210 determines that the current over-provisioning ratio is not set at the maximum OP threshold value (negative determination in block 507), the storage control system 210 will proceed to adaptively tune the over-provisioning ratio by automatically increasing the over-provisioning ratio by a determined amount (block 508). As noted above, increasing the over-provisioning ratio is performed to achieve an anticipated increase in the endurance of the solid-state storage devices, as well as an anticipated reduction in write amplification. The amount by which the over-provisioning ratio is increased is based, at least in part on, the amount by which the current overall wear-level of the array of solid-state storage devices exceeds the target endurance parameter value.

The storage control system 210 will automatically allocate additional over-provisioned capacity based on the new (increased) over-provisioning ratio (block 509). In some embodiments, for RAID configurations, the storage control system 210 will allocate additional over-provisioned capacity by reserving additional RAID stripes. In some embodiments, the storage control system 210 will maintain a list of reserved RAID 6 stripes, i.e., RAID stripes which are empty and which cannot be written to. If the storage control system 210 determines that there is not enough free capacity to allocate for the additional over-provisioned capacity that is needed based on the new over-provisioning ratio, the storage control system 210 can invoke the garbage collection/defragmentation control module 250 to obtain the additional free capacity (e.g., free-up additional RAID stripes) as needed for over-provisioning. The additional free capacity is added to the OP reserved list so that such capacity is deemed unavailable for writing data. When the additional capacity (e.g., RAID stripes) is freed-up and added to the OP reserved list, the storage control system 210 will issue an over-provisioning trim ("OP Trim") command for the trimmed capacity (and for each drive) to instruct that that the trimmed capacity should be utilized as over-provisioned capacity.

Referring back to the determination result of block 504 of FIG. 5, when the storage control system 210 determines that the current overall wear-level of array of solid-state storage devices is below the target endurance parameter value (block 510), the storage control system 210 will determine if the current over-provisioning ratio is set at the minimum OP threshold value (block 511). The current overall wear-level of the solid-state storage 270 can decrease during extended periods of "read-intensive" workloads. If the current over-provisioning ratio is determined to be set at the minimum OP threshold value (affirmative determination in block 511), the storage control system 210 will maintain the current over-provisioning ratio at its current minimum threshold amount (block 512).

On the other hand, if the storage control system 210 determines that the current over-provisioning ratio is not set at the minimum OP threshold value (negative determination in block 511), the storage control system 210 will proceed to adaptively tune the over-provisioning ratio by automatically decreasing the over-provisioning ratio by a determined amount (block 513). This allows the storage control system 210 to begin a process to reclaim some portion of the over-provisioned capacity for use as storage capacity by the host systems. While reducing the over-provisioning ratio may lead to more wear on the solid-state storage as well as increase the write amplification, the tradeoff would be the advantage of having additional user capacity during actual or anticipated "read-intensive" periods which do not necessarily cause wear on the solid-state storage devices as compared to write operations. The amount by which the over-provisioning ratio is decreased is based, at least in part on, the amount by which the current overall wear-level of the array of solid-state storage devices 270 falls below the target endurance parameter value.

When the overall wear level is below the target DWPD value (i.e. low write load), the storage control system 210 will automatically reclaim a portion of the over-provisioned capacity from each of the solid-state storage devices to reclaim a total amount of over-provisioned capacity as user capacity, based on the decrease in the over-provisioning ratio (block 514). In some embodiments, the storage control system 210 sends "reclaim" command to each solid-state storage device, wherein the reclaim command specifies an amount of over-provisioned capacity that the storage control system 210 wants to reclaim from the current over-provisioned capacity of the solid-state storage devices and added to the user capacity. Accordingly, the storage control system 210 will remove a number of RAID stripes from the reserved list having a total capacity that is equivalent to the amount of over-provisioned capacity to be reclaimed for user capacity, and thereby allow the RAID stripes to be used for storing user data. It is to be understood that the over-provisioned capacity can be dynamically adjusted (increased or decreased) using known techniques such as adjusting the maximum LBA on the drive level so that the host systems see a modified capacity drive.

Figure 6:
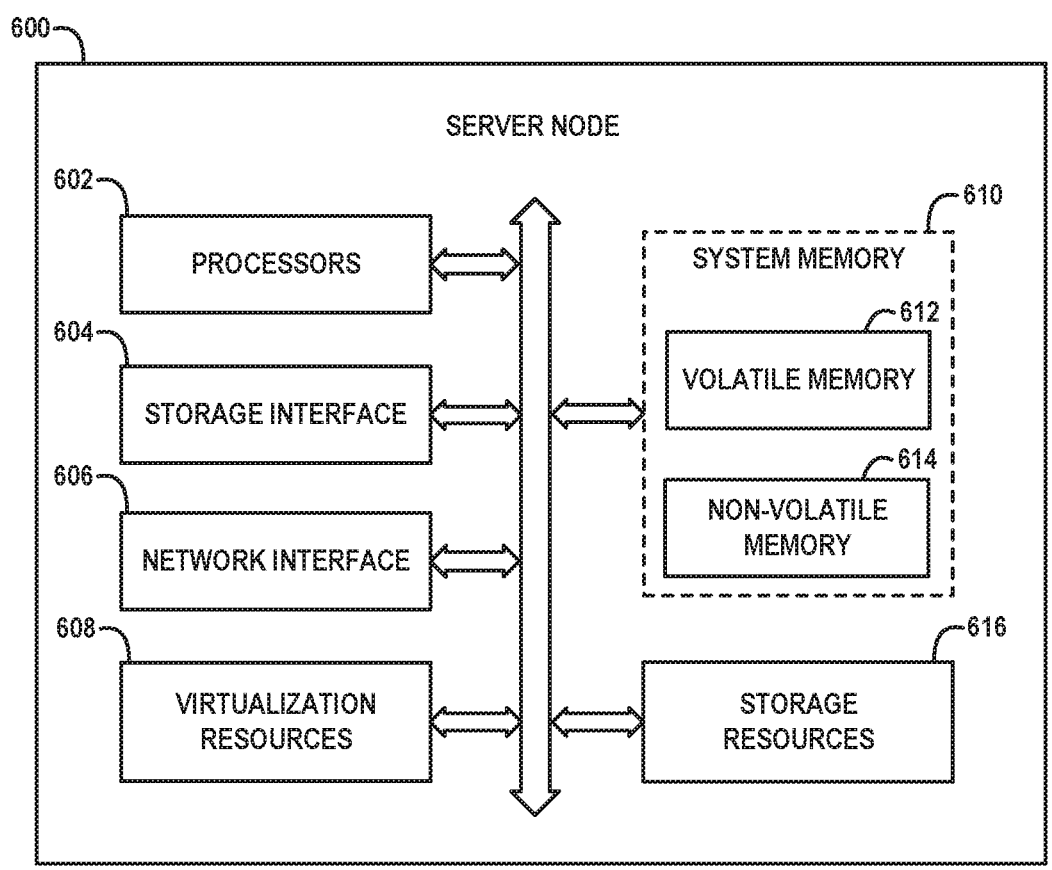
FIG. 6 schematically illustrates a framework of a server node which can host a data storage system that is configured to implement automated adaptive endurance tuning of solid-state storage media, according to an exemplary embodiment of the disclosure.

FIG. 6 schematically illustrates a framework of a server node which can host a data storage system that is configured to implement automated adaptive endurance tuning of solid-state storage media, according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600. For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of the storage control system 210, including the adaptive endurance tuning control system 260 (FIG. 2) as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., storage control system 210, including the adaptive endurance tuning control system 260 (FIG. 2), comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile system memory 612 is configured as the highest-level memory tier, and the non-volatile system memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
    tracking, by a storage control system, usage metrics associated with utilization of solid-state storage devices of a storage system, wherein the storage system comprises an amount of over-provisioned capacity allocated in the solid-state storage devices according to an over-provisioning factor;
    determining, by the storage control system, a current endurance value of the storage system, wherein the current endurance value of the storage system is determined based at least in part on a wear-level measure of the storage system, which is determined based at least in part on the tracked usage metrics associated with the utilization of the solid-state storage devices of the storage system;

comparing, by the storage control system, the current endurance value to a target endurance value specified for the storage system to determine if the current endurance value differs from the target endurance value;

in response to determining, by the storage control system, that the current endurance value exceeds the target endurance value, then one of (i) adjusting the over-provisioning factor by automatically increasing the over-provisioning factor, and (ii) maintaining the over-provisioning factor, if the over-provisioning factor is currently set to a first over-provisioning factor threshold value:

in response to determining, by the storage control system, that the current endurance value is less than the target endurance value, then one of (i) adjusting the over-provisioning factor by automatically decreasing the over-provisioning factor, and (ii) maintaining the over-provisioning factor, if the over-provisioning factor is currently set to a second over-provisioning factor threshold value, wherein the second over-provisioning factor threshold value is less than the first over-provisioning factor threshold value; and automatically adjusting, by the storage control system, the amount of over-provisioned capacity allocated in the solid-state storage devices of the storage system according to the adjusted over-provisioning factor.

2. The method of claim 1, wherein the current endurance value comprises an average drive writes per day (DWPD) value that is estimated based on the usage metrics, and wherein the target endurance value comprises a target DWPD value.

3. The method of claim 1, wherein the target endurance value is set by a configurable target endurance parameter of the storage system, wherein a value of the configurable target endurance parameter is at least one of user-defined and automatically configured by the storage control system.

4. The method of claim 1, wherein the usage metrics comprise one or more of (i) read/write ratios associated with read operations and write operations performed by the solid-state storage devices, (ii) program/erase cycle counts for blocks of the solid-state storage devices, (iii) a total amount of host writes to the solid-state storage devices, and (iv) a total amount of physical writes to the solid-state storage devices.

5. The method of claim 1, further comprising maintaining, by the storage control system, the over-provisioning factor in response to determining that the current endurance value is substantially equal to the target endurance value.

6. The method of claim 1, wherein:
the first over-provisioning factor threshold value comprises a maximum over-provisioning factor threshold value; and
the second over-provisioning factor threshold value comprises a minimum over-provisioning factor threshold value.

7. The method of claim 1, wherein automatically adjusting the amount of over-provisioned capacity allocated in the solid-state storage devices according to the adjusted over-provisioning factor comprises at least one of:
automatically allocating, by the storage control system, an additional amount of over-provisioned capacity in the solid-state storage devices based on the increased amount of the over-provisioning factor; and
automatically reclaiming, by the storage control system, an amount of over-provisioned capacity from the solid-state storage devices based on the decreased amount of the over-provisioning factor.

8. The method of claim 7, wherein automatically allocating an additional amount of over-provisioned capacity comprises:
reserving, by the storage control system, an amount of free user capacity of the solid-state storage devices for use as additional over-provisioned capacity; and
issuing, by the storage control system, an over-provisioning trim command to indicate that the reserved amount of free user capacity of the solid-state storage devices is to be allocated as over-provisioned capacity.

9. An article of manufacture comprising a non-transitory processor-readable storage medium having stored therein program code of one or more software programs, wherein the program code is executable by one or more processors to implement a method which comprises:
tracking, by a storage control system, usage metrics associated with utilization of solid-state storage devices of a storage system, wherein the storage system comprises an amount of over-provisioned capacity allocated in the solid-state storage devices according to an over-provisioning factor;

determining, by the storage control system, a current endurance value of the storage system, wherein the current endurance value of the storage system is determined based at least in part on a wear-level measure of the storage system, which is determined based at least in part on the tracked usage metrics associated with the utilization of the solid-state storage devices of the storage system;

comparing, by the storage control system, the current endurance value to a target endurance value specified for the storage system to determine if the current endurance value differs from the target endurance value;

in response to determining, by the storage control system, that the current endurance value exceeds the target endurance value, then one of (i) adjusting the over-provisioning factor by automatically increasing the over-provisioning factor, and (ii) maintaining the over-provisioning factor, if the over-provisioning factor is currently set to a first over-provisioning factor threshold value;

in response to determining, by the storage control system, that the current endurance value is less than the target endurance value, then one of (i) adjusting the over-provisioning factor by automatically decreasing the over-provisioning factor, and (ii) maintaining the over-provisioning factor, if the over-provisioning factor is currently set to a second over-provisioning factor threshold value, wherein the second over-provisioning factor threshold value is less than the first over-provisioning factor threshold value; and automatically adjusting, by the storage control system, the amount of over-provisioned capacity allocated in the solid-state storage devices of the storage system according to the adjusted over-provisioning factor.

10. The article of manufacture of claim 9, wherein the current endurance value comprises an average drive writes per day (DWPD) value that is estimated based on the usage metrics, and wherein the target endurance value comprises a target DWPD value.

11. The article of manufacture of claim 9, wherein the target endurance value is set by a configurable target endurance parameter of the storage system, wherein a value of the configurable target endurance parameter is at least one of user-defined and automatically configured by the storage control system.

12. The article of manufacture of claim 9, wherein the usage metrics comprise one or more of (i) read/write ratios associated with read operations and write operations performed by the solid-state storage devices, (ii) program/erase cycle counts for blocks of the solid-state storage devices, (iii) a total amount of host writes to the solid-state storage devices, and (iv) a total amount of physical writes to the solid-state storage devices.

13. The article of manufacture of claim 9, further comprising program code which is executable by the one or more processors to implement a process which comprises maintaining, by the storage control system, the over-provisioning factor in response to determining that the current endurance value is substantially equal to the target endurance value.

14. The article of manufacture of claim 9,
wherein automatically adjusting the amount of over-provisioned capacity allocated in the solid-state storage devices according to the adjusted over-provisioning factor comprises at least one of:
automatically allocating, by the storage control system, an additional amount of over-provisioned capacity in the solid-state storage devices based on the increased amount of the over-provisioning factor; and
automatically reclaiming, by the storage control system, an amount of over-provisioned capacity from the solid-state storage devices based on the decreased amount of the over-provisioning factor.

15. The article of manufacture of claim 14, wherein automatically allocating an additional amount of over-provisioned capacity comprises:
reserving, by the storage control system, an amount of free user capacity of the solid-state storage devices for use as additional over-provisioned capacity; and
issuing, by the storage control system, an over-provisioning trim command to indicate that the reserved amount of free user capacity of the solid-state storage devices is to be allocated as over-provisioned capacity.

16. A storage system, comprising:
a plurality of solid-state storage devices;
at least one processor; and
a system memory configured to store program code, wherein the program code is executable by the at least one processor to implement a storage control system that is configured to:
track usage metrics associated with utilization of the solid-state storage devices of the storage system, wherein the storage system comprises an amount of over-provisioned capacity allocated in the solid-state storage devices according to an over-provisioning factor;
determine a current endurance value of the storage system, wherein the current endurance value of the storage system is determined based at least in part on a wear-level measure of the storage system, which is determined based at least in part on the tracked usage metrics associated with the utilization of the solid-state storage devices of the storage system;
compare the current endurance value to a target endurance value specified for the storage system to determine if the current endurance value differs from the target endurance value;
in response to determining that the current endurance value exceeds the target endurance value, then one of (i) adjust the over-provisioning factor by automatically increasing the over-provisioning factor, and (ii) maintain the over-provisioning factor, if the over-provisioning factor is currently set to a first over-provisioning factor threshold value;
in response to determining that the current endurance value is less than the target endurance value, then one of (i) adjust the over-provisioning factor by automatically decreasing the over-provisioning factor, and (ii) maintain the over-provisioning factor, if the over-provisioning factor is currently set to a second over-provisioning factor threshold value, wherein the second over-provisioning factor threshold value is less than the first over-provisioning factor threshold value; and
automatically adjust the amount of over-provisioned capacity allocated in the solid-state storage devices of the storage system according to the adjusted over-provisioning factor.

17. The data storage system of claim 16, wherein:
the target endurance value is set by a configurable target endurance parameter of the storage system, wherein a value of the configurable target endurance parameter is at least one of user-defined and automatically configured by the storage control system; and
the current endurance value comprises an average drive writes per day (DWPD) value that is estimated based on the usage metrics, and wherein the target endurance value comprises a target DWPD value.

18. The data storage system of claim 16, wherein:
the storage control system is configured to maintain the over-provisioning factor in response to determining that the current endurance value is substantially equal to the target endurance value;
the first over-provisioning factor threshold value comprises a maximum over-provisioning factor threshold value; and
the second over-provisioning factor threshold value comprises a minimum over-provisioning factor threshold value.

19. The data storage system of claim 16, wherein:
in automatically adjusting the amount of over-provisioned capacity allocated in the solid-state storage devices according to the adjusted over-provisioning factor, the storage control system is configured to at least one of:
automatically allocate an additional amount of over-provisioned capacity in the solid-state storage devices based on the increased amount of the over-provisioning factor; and
automatically reclaim an amount of over-provisioned capacity from the solid-state storage devices based on the decreased amount of the over-provisioning factor; and
in automatically allocating an additional amount of over-provisioned capacity, the storage control system is configured to:
reserve an amount of free user capacity of the solid-state storage devices for use as additional over-provisioned capacity; and
issuing an over-provisioning trim command to indicate that the reserved amount of free user capacity of the solid-state storage devices is to be allocated as over-provisioned capacity.

20. The article of manufacture of claim 9, wherein:

the first over-provisioning factor threshold value comprises a maximum over-provisioning factor threshold value; and the second over-provisioning factor threshold value comprises a minimum over-provisioning factor threshold value.

\* \* \* \* \*